UNITED STATES PATENT OFFICE.

RICHARD L. DE LISSER, OF BROOKLYN, NEW YORK.

FILTERING DEVICE OR STONE.

SPECIFICATION forming part of Letters Patent No. 340,295, dated April 20, 1886.

Application filed December 19, 1884. Serial No. 150,797. (No specimens.)

*To all whom it may concern:*

Be it known that I, RICHARD L. DE LISSER, of Brooklyn, New York, have invented a new and useful Filtering Device or Stone, of which the following is a full and accurate description.

My invention consists in artificially producing a porous stone or slab, through which the liquid to be filtered passes, usually under pressure, the pores in the stone or slab being so small that the impurities contained in the liquid and not in solution are separated from the liquid and remain on the surface of the stone, the pure liquid only passing through it; and in the manufacture of my stones or slabs I combine materials in such proportions and of such nature that I am enabled to add to the density, hardness, and strength of the stones to adapt them to different liquid pressures and to the filtration of different kinds of liquids, and also to prevent them from being worn away by repeated cleansing; and I also give the stones such shape as may be most convenient for cleansing, and also to add to their strength.

The ingredients and proportion in which they are used for making my common or ordinary stone, suitable for water or beer filtration, are as follows: Asbestus, preferably ground or finely divided, nine (9) parts; common brick-clay of good quality, three (3) parts; fine saw-dust, one (1) part. These ingredients are thoroughly mixed together with sufficient water to cause them to adhere and to form a plastic mass, preferably of about the consistency of ordinary potters' clay. From this material the stones are formed in molds, or, in any other suitable manner, into blocks, slabs, or tiles of such dimensions and shapes as may be desired and from, say, half an inch to two or more inches in thickness, as required; and they may be flat, concave or convex, or concavo-convex, or of any other desired shape. After being formed as desired they are burned in a suitable furnace or kiln in the same manner that pottery and analogous manufactures are burned. When finished, it will be found that the stones possess a fine hard surface and are exceedingly porous, but that the pores are very minute, and that they (the stones) are very uniform and homogeneous in quality, and that the impurities separated from the liquid being filtered can be very readily removed from the surface thereof, so that the stone can be easily kept clean and in suitable condition for use.

I usually employ these stones as part of a suitable structure or filter, the stones practically forming the bottom thereof; but they may be used independently of such structure as suction filtering-stones—*i. e.*, stones to which are attached a suitable tube, and which may then be placed in liquids containing impurities not in solution, and upon suction being applied to the tube the clear liquid only will be drawn through the tube, the impurities being separated by the stone on the end of the tube—and they may also be used in all instances where the liquid can be made to pass through them.

I have found that for filtering certain liquids, and also when the stone is frequently scraped or brushed to keep it clean, that it is desirable to have them harder than those produced by the above ingredients and proportions, and I have discovered that an increase in the proportions of the clay employed adds to the hardness of the stone, and also that the addition of from one (1) to three (3) or more parts of sand, flint, cracked glass, mica, and the like bodies act as protectors to the surface of the stone and practically prevent it from wearing away, and also add strength and durability to it in other particulars.

Instead of saw-dust any finely-divided combustible substance may be employed, and almost any kind of clay or analogous substance suitable for pottery or brick making may be employed, and the proportions cited by me may be varied, the only effect of variations being that the strength, durability and porosity of the stone will thereby be affected.

I am aware that clay has been mixed with substances that will be driven off by the burning process, and that thus a slab of burned clay has been made filled with holes, and also that asbestus has been combined with various silicates and molded into shape to form a filtering material; also that clay with combustible substances and pumice-stone and French calcimine have been mixed together and then dried or burned in the manner of unglazed pottery; and I do not lay claim to any of these things, since they are all foreign to my invention, because none of them constitute a filtering-stone in which fibrous asbestus largely predominates, and which is held in position by the clay, which, when burned, solidifies and becomes brick-like or stone-like and acts as a binder for the other materials employed.

Having described my invention, I claim—

1. The described filtering device composed of asbestus and combustible material combined with clay, which, being burned, solidifies and acts as a binder for the asbestus and the coal of the combustible material, substantially as and for the purposes set forth.

2. The described filtering device, consisting of asbestus mixed with a water-absorbent material, such as clay, and which, being burned, will solidify and act as a binder to hold the asbestus in place, substantially as and for the purposes set forth.

3. The described filtering device, composed of asbestus, clay, and a hardening material, such as flint, sand, and the like, the whole being mixed together, molded into form, and burned, substantially as and for the purposes set forth.

Signed at New York, in the county of New York and State of New York, this 18th day of December, A. D. 1884.

R. L. DE LISSER.

Witnesses:
JOHN H. IVES,
SHERWOOD CONNELL.